United States Patent
Chen et al.

(10) Patent No.: US 8,538,474 B2
(45) Date of Patent: Sep. 17, 2013

(54) METHOD AND APPARATUS OF ADJUSTING TRANSMISSION POWER

(71) Applicant: Huawei Technologies Co., Ltd., Guangdong (CN)

(72) Inventors: Zihuan Chen, Chengdu (CN); Dafeng Tian, Chengdu (CN); Jun Ma, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/625,638

(22) Filed: Sep. 24, 2012

(65) Prior Publication Data

US 2013/0023298 A1  Jan. 24, 2013

Related U.S. Application Data

(63) Continuation of application No. PCT/CN2011/075240, filed on Jun. 3, 2011.

(30) Foreign Application Priority Data

Nov. 26, 2010  (CN) .......................... 2010 1 0561006

(51) Int. Cl.
  *H04B 1/00*  (2006.01)
  *H04B 7/00*  (2006.01)
  *H04B 1/04*  (2006.01)
  *H01Q 11/12*  (2006.01)
  *H04W 4/00*  (2009.01)
  *G08C 17/00*  (2006.01)
  *H04K 1/10*  (2006.01)
  *H04L 27/28*  (2006.01)
  *H04L 27/00*  (2006.01)
  *H04N 7/173*  (2011.01)

(52) U.S. Cl.
USPC ........ 455/522; 455/69; 455/127.1; 455/435.1; 370/244; 370/311; 370/331; 375/260; 375/295; 725/107

(58) Field of Classification Search
USPC .................... 455/67.1, 69, 115.1, 126, 127.1, 455/127.2, 226.1, 276.1, 253, 410, 418, 419, 455/423, 427, 435.1, 436, 442, 446, 447, 455/452.1, 456.1, 517, 522, 572, 574, 73, 455/102, 450, 501, 509, 561; 370/208, 244, 370/252, 316, 318, 320, 328, 329, 330, 331, 370/332, 337, 343, 345, 347, 352, 448, 311, 370/335, 342; 375/319, 321, 260, 296, 130, 375/219, 295, 297, 298; 725/107, 119
See application file for complete search history.

(56) References Cited

U.S. PATENT DOCUMENTS

2002/0168994 A1* 11/2002 Terry et al. .................... 455/522
2006/0293074 A1* 12/2006 Bottomley et al. ........... 455/522

(Continued)

FOREIGN PATENT DOCUMENTS

CN  1998247 A  7/2007
CN  101133674 A  2/2008

(Continued)

OTHER PUBLICATIONS

International Search Report dated Sep. 15, 2011 in connection with International Patent Application No. PCT/CN2011/075240.

(Continued)

*Primary Examiner* — Fayyaz Alam
*Assistant Examiner* — Paul P Tran (57) ABSTRACT

A method and an apparatus of adjusting transmission power are provided. Transmission power configuration information is acquired, where the transmission power configuration information includes a transmission power lower limit and a transmission power upper limit; modulation mode configuration information is acquired, where the modulation mode configuration information includes a lower limit modulation mode and an upper limit modulation mode; current channel information is acquired; calculation is performed according to the current channel information, the transmission power configuration information and the modulation mode configuration information to obtain first transmission power and a first modulation mode; and signal transmission is controlled according to the first transmission power and the first modulation mode.

4 Claims, 4 Drawing Sheets

(56) References Cited

U.S. PATENT DOCUMENTS

| | | | |
|---|---|---|---|
| 2007/0099648 A1* | 5/2007 | Kim et al. | 455/522 |
| 2008/0039129 A1* | 2/2008 | Li et al. | 455/522 |
| 2008/0113634 A1 | 5/2008 | Gates et al. | |
| 2008/0186915 A1* | 8/2008 | Kim et al. | 370/329 |
| 2009/0219855 A1 | 9/2009 | Ishii | |
| 2010/0002616 A1 | 1/2010 | Peng et al. | |
| 2010/0023830 A1* | 1/2010 | Wengerter et al. | 714/748 |
| 2010/0120464 A1 | 5/2010 | Bjorken et al. | |
| 2010/0122099 A1 | 5/2010 | Lim et al. | |
| 2011/0223950 A1* | 9/2011 | Shibuya | 455/501 |
| 2012/0026896 A1 | 2/2012 | Li et al. | |
| 2012/0040709 A1* | 2/2012 | Song et al. | 455/522 |

FOREIGN PATENT DOCUMENTS

| | | | |
|---|---|---|---|
| CN | 101237260 A | 8/2008 | |
| EP | 1 965 531 A1 | 9/2008 | |
| WO | WO 2006/092976 A1 | 9/2006 | |

OTHER PUBLICATIONS

3GPP TS 25.214 V9.3.0 "3rd Generation Partnership Project; Technical Specfication Group Radio Access Network; Physical layer procedures (FDD)(Release 9)", Sep. 2010, Section 5, 98 pages.

Supplementary European Search Report dated Jan. 24, 2013 in connection with European Patent Application No. EP 11 78 6119.

Partial Translation of Office Action dated Nov. 19, 2012 in connection with Chinese Patent Application No. 201010561006.8.

Search Report dated Nov. 8, 2012 in connection with Chinese Patent Application No. 2010105610068.

* cited by examiner

METHOD AND APPARATUS OF ADJUSTING TRANSMISSION POWER

CROSS-REFERENCE TO RELATED APPLICATIONS

This application is a continuation of International Application No. PCT/CN2011/075240, filed on Jun. 3, 2011, which claims priority to Chinese Patent Application No. 201010561006.8, filed on Nov. 26, 2010, both of which are hereby incorporated by reference in their entireties.

TECHNICAL FIELD

The present invention relates to the field of communications technologies, and in particular, to a method and an apparatus of adjusting transmission power.

BACKGROUND

Fiber transmission is very mature both in the technical aspect and in the network application aspect, but a wireless manner needs to be used for transmission in many places due to the limitation of landforms. In the case of requiring a large amount of bandwidth, a microwave transmission manner is generally adopted. At present, in markets such as base station backhaul transmission of a mobile cellular system, a metropolitan area network in a transmission network, a digital trunk transmission network of radio and television, a private network (for example, electricity power and military) and large enterprise access network, the microwave transmission is widely applied.

In a microwave transmission communication system, commonly used frequency bands are 1.4 GHz-2.7 GHz, 3 GHz-11 GHz, and 23 GHz-55 GHz, channel bandwidth is from 0.025 MHz to 56 MHz, and a transmission rate may reach hundreds of MBps.

With the increase of service demands, the microwave transmission system needs to develop towards higher-speed transmission communication. Currently, E-Band frequency bands such as 71 GHz-76 GHz and 81 GHz-86 GHz may be used, and the channel bandwidth is 250 MHz. When an ultra wideband is adopted for data transmission, the transmission rate may be up to GBps.

A high frequency band channel is likely to be affected by environmental factors such as the weather. In fine weather, the channel environment is good, and the channel condition is desirable; in awful weather, the channel condition is poor. In order to further improve the transmission efficiency, the Adaptive Modulation (Adaptive Modulation, AM) technology is usually adopted. A high modulation mode is used when the channel condition is desirable, and a low modulation mode is used when the channel condition is poor. When the channel condition varies, in the prior art, the channel environment is not taken into consideration during the adjustment of the transmission power, and too high transmission power may cause a waste of a system gain and meanwhile may interfere with other transmission systems, and even too low transmission power causes service interruption.

SUMMARY

Embodiments of the present invention provide a method and an apparatus of adjusting transmission power, which may adjust a modulation mode and transmission power when the channel condition varies.

A method of adjusting transmission power includes:
acquiring transmission power configuration information, where the transmission power configuration information includes a transmission power lower limit and a transmission power upper limit;
acquiring modulation mode configuration information, where the modulation mode configuration information includes a lower limit modulation mode and an upper limit modulation mode;
acquiring current channel information;
calculating, according to the current channel information, the transmission power configuration information and the modulation mode configuration information, to obtain first transmission power and a first modulation mode; and
controlling signal transmission according to the first transmission power and the first modulation mode.

An apparatus of adjusting transmission power includes:
a transmission power configuration information acquiring unit, configured to acquire transmission power configuration information, where the transmission power configuration information includes a transmission power lower limit and a transmission power upper limit;
a modulation mode configuration information acquiring unit, configured to acquire modulation mode configuration information, where the modulation mode configuration information includes a lower limit modulation mode and an upper limit modulation mode;
a channel information acquiring unit, configured to acquire current channel information;
a calculation unit, configured to calculate, according to the current channel information, the transmission power configuration information and the modulation mode configuration information, to obtain first transmission power and a first modulation mode; and
a control unit, configured to control signal transmission according to the first transmission power and the first modulation mode.

In the embodiments of the present invention, the transmission power configuration information is acquired, where the transmission power configuration information includes the transmission power lower limit and the transmission power upper limit; the modulation mode configuration information is acquired, where the modulation mode configuration information includes a lower limit modulation mode and an upper limit modulation mode; the current channel information is acquired; calculation is performed according to the current channel information, the transmission power configuration information and the modulation mode configuration information to obtain first transmission power and a first modulation mode; and the signal transmission is controlled according to the first transmission power and the first modulation mode. When the channel condition varies, the calculation is performed by taking into account the channel information, the transmission power configuration information and the modulation mode configuration information to obtain the first transmission power and the first modulation mode, where the first transmission power is between the transmission power lower limit and the transmission power upper limit, and the first modulation mode is between the lower limit modulation mode and the upper limit modulation mode. When the channel condition varies, the calculation is performed according to the channel condition to obtain optimized transmission power and an optimized modulation mode, thereby improving the transmission efficiency, and effectively avoiding service interruption caused by too low transmission power and a waste of a system gain caused by too high transmission power.

BRIEF DESCRIPTION OF THE DRAWINGS

To illustrate the technical solutions of the embodiments of the present invention or in the prior art more clearly, the accompanying drawings for describing the embodiments or the prior art are introduced briefly in the following. Apparently, the accompanying drawings in the following description are only some embodiments of the present invention, and persons skilled in the art may derive other drawings from the accompanying drawings without creative efforts.

DETAILED DESCRIPTION

The technical solutions of the present invention are clearly and completely described in the following with reference to the accompanying drawings. It is obvious that the embodiments to be described are a part rather than all of the embodiments of the present invention. All other embodiments obtained by persons skilled in the art based on the embodiments of the present invention without creative efforts shall fall within the protection scope of the present invention.

Figure 1:
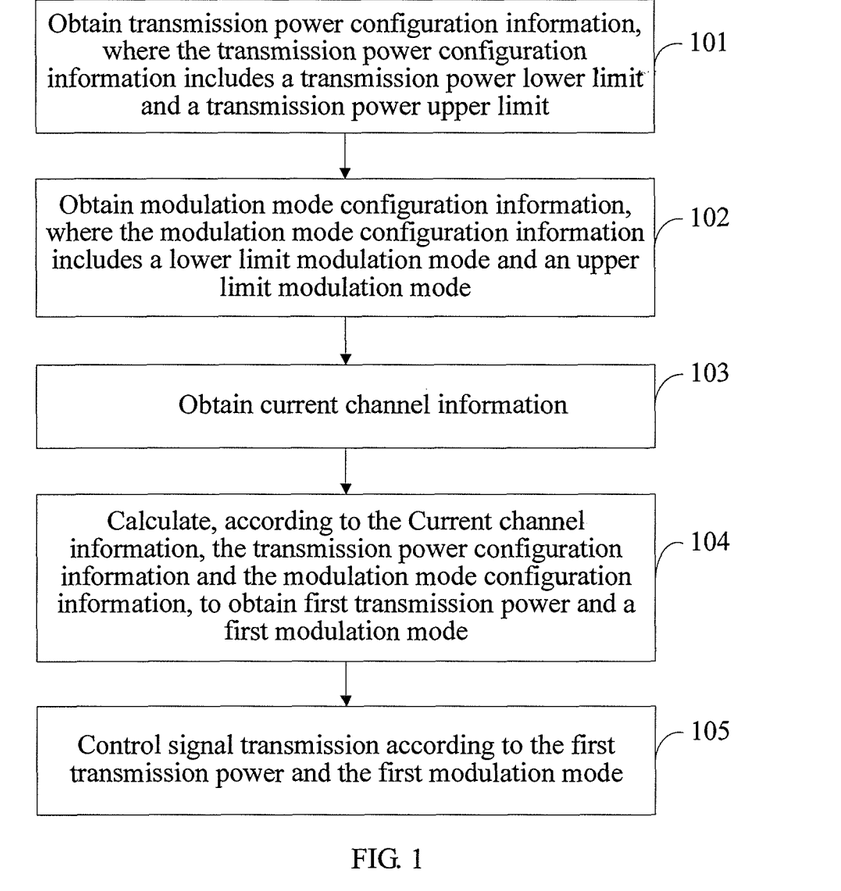
FIG. 1 is a flow chart of a method of adjusting transmission power according to an embodiment of the present invention.

As shown in FIG. 1, an embodiment of the present invention provides a method of adjusting transmission power, which includes:

S101: Obtain transmission power configuration information, where the transmission power configuration information includes a transmission power lower limit and a transmission power upper limit.

S102: Obtain modulation mode configuration information, where the modulation mode configuration information includes a lower limit modulation mode and an upper limit modulation mode.

S103: Obtain current channel information.

S104: Calculate, according to the current channel information, the transmission power configuration information and the modulation mode configuration information, to obtain first transmission power and a first modulation mode.

S105: Control signal transmission according to the first transmission power and the first modulation mode.

Figure 2:
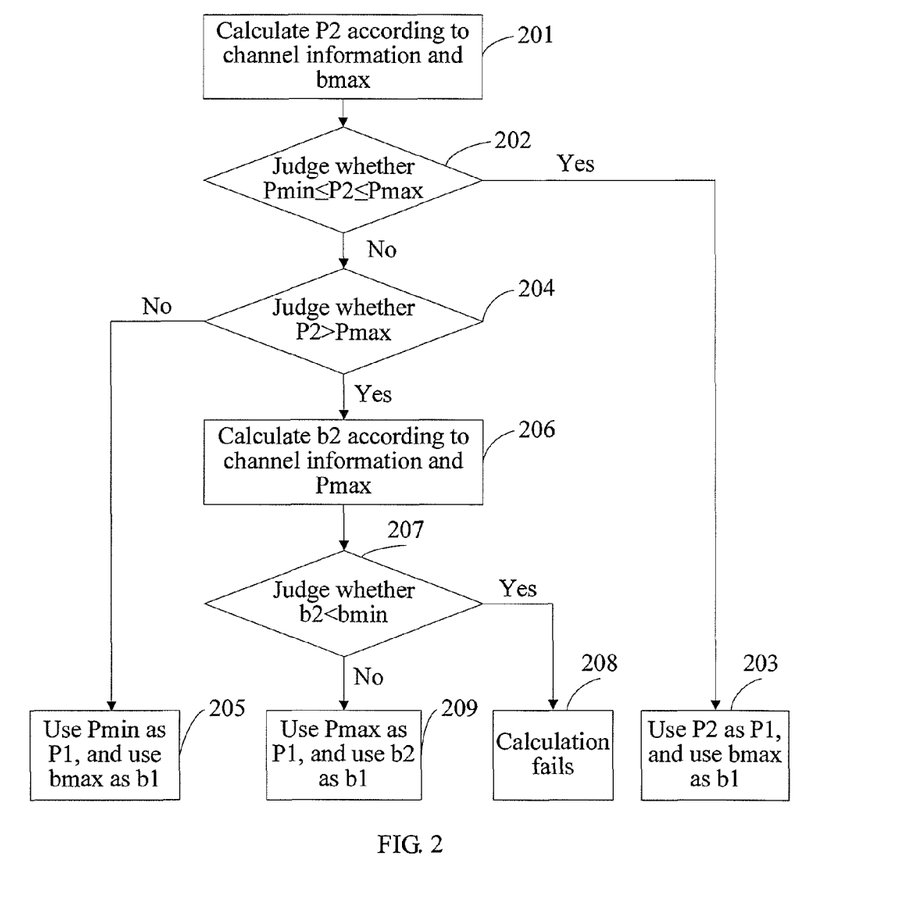
FIG. 2 is a flow chart of a method of calculating transmission power and a modulation mode according to an embodiment of the present invention.

As shown in FIG. 2, an embodiment of the present invention provides a method of calculating transmission power and a modulation mode. In this embodiment, for ease of description, it is set that a transmission power lower limit is Pmin, a transmission power upper limit is Pmax, a lower limit modulation mode is bmin, an upper limit modulation mode is bmax, first transmission power is P1, second transmission power is P2, a first modulation mode is b1, a second modulation mode is b2, and a current transmission power is P0. The method includes the following steps:

S201: Calculate, according to channel information and the upper limit modulation mode, to obtain the second transmission power.

In this embodiment, the channel information includes a channel transfer function H and channel noise power $\sigma^2$, and calculation is performed according to the channel transfer function H and channel noise power $\sigma^2$ of the channel information and bmax to obtain P2.

A Shannon formula is as follows:

$$b = \log_2\left(1 + \frac{SNR}{\Gamma}\right).$$

where, b indicates the number of bits that may be borne, that is, corresponding to the modulation mode; $\Gamma$ is a loss compared with theoretically optimal performance, $\Gamma=\gamma_{ber}+\gamma_m-\gamma_c$, $\gamma_{ber}$ is a parameter related to a bit error rate, $\gamma_m$ is a margin (Margin), $\gamma_c$ is a coding gain (Coding Gain), that is, $\Gamma$ may be obtained through calculating according to a required bit error rate, the margin, and a coding gain corresponding to a used coding manner.

A formula of calculating Signal Noise Ratio is as follows:

$$SNR = \frac{P|H|^2}{\sigma^2}.$$

The following formula may be obtained according to the Shannon formula of bmax and the formula of calculating Signal Noise Ratio:

$$P2 = \frac{(2^{bmax} - 1)\Gamma\sigma^2}{|H|^2}.$$

P2 is obtained through calculating according to the formula $$P2 = \frac{(2^{bmax} - 1)\Gamma\sigma^2}{|H|^2},$$

the channel transfer function H and channel noise power $\sigma^2$ of the channel information, and bmax.

In the embodiment of the present invention, the channel transfer function H and channel noise $\sigma^2$ of the channel information may be obtained through a manner based on pilot or training.

Take the pilot as an example for brief description. A transmission end transmits a pilot signal $S_{pt}$, the channel transfer function is H, the channel noise is n (the power thereof is $\sigma^2$), and a receiving end receives a pilot signal $Y_{pt}$, and then the following may be obtained:

$$\begin{cases} Y_{pt0} = H \cdot S_{pt0} + n \\ Y_{pt1} = H \cdot S_{pt1} + n, \end{cases}$$

where, subscripts 0 and 1 respectively indicate a pilot signal 1 and a pilot signal 2.

The pilot signal transmitted by the transmission end is known by the receiving end, so it is merely required to solve the above equations to obtain the channel transfer function and the noise. Definitely, multiple equations may be further acquired here, and are solved through a least-squares method.

In other embodiments, the channel information may further include a Mean Square Error (Mean Square Error, MSE) of the received signal and current transmission power P0. P2 is obtained through calculating according to the Mean Square Error (Mean Square Error, MSE) of the received signal and current transmission power P0 of the channel information, and bmax.

The Mean Square Error (Mean Square Error, MSE) of the received signal may be approximately equivalent to the Signal Noise Ratio (Signal Noise Ratio, SNR), that is:

$$SNR = \frac{P0|H|^2}{\sigma^2} \approx MSE,$$

where, P0 indicates the current transmission power, $|H|^2$ indicates channel attenuation, and $\sigma^2$ indicates the channel noise power.

The following equation is obtained:

$$\frac{|H|^2}{\sigma^2} = \frac{MSE}{P0}.$$

The following equation is further obtained according to the formula $$P2 = \frac{(2^{b_{max}} - 1)\Gamma \sigma^2}{|H|^2};$$

$$P2 = \frac{(2^{b_{max}} - 1)\Gamma P0}{MSE}.$$

P2 is obtained through calculating according to the formula $$P2 = \frac{(2^{b_{max}} - 1)\Gamma P0}{MSE},$$

the Mean Square Error (Mean Square Error, MSE) of the received signal and current transmission power P0 of the channel information, and bmax.

Definitely, the second transmission power may be obtained through calculating according to other calculation formulas, other channel information and the upper limit modulation mode, which is not detailed here.

S202: Judge whether the second transmission power is between the transmission power lower limit and the transmission power upper limit, and if yes, execute step S203; if not, execute step S204; that is, judge whether Pmin≦P2≦Pmax, if yes, execute step S203; if not, execute step S204.

S203: Use the second transmission power as the first transmission power, and use the upper limit modulation mode as the first modulation mode, that is, use P2 as P1, and use bmax as b1.

S204: Judge whether the second transmission power is greater than the transmission power upper limit, and if yes, execute step S206; if not, execute step S205; that is, judge whether P2>Pmax, if yes, execute step S206; if not, execute step S205.

S205: Use the transmission power lower limit as the first transmission power, and use the upper limit modulation mode as the first modulation mode, that is, use Pmin as P1, and use bmax as b1.

S206: Calculate according to the transmission power upper limit and the channel information to obtain the second modulation mode.

In this embodiment, based on the following formula:

$$b2 = \log_2\left(1 + \frac{P_{max}|H|^2}{\Gamma\sigma^2}\right),$$

and b2 is obtained through calculating according to the channel transfer function H and channel noise power $\sigma^2$ of the channel information, and Pmax.

S207: Judge whether the second modulation mode is less than the lower limit modulation mode, and if yes, execute step S208; if not, execute step S209; that is, judge whether b2<bmin, if yes, execute step S208; if not, execute step S209.

S208: Communication may not be performed in the channel environment, and the calculation fails.

S209: Use the transmission power upper limit as the first transmission power, and use the second modulation mode as the first modulation mode, that is, use Pmax as P1, and use b2 as b1.

Figure 3:
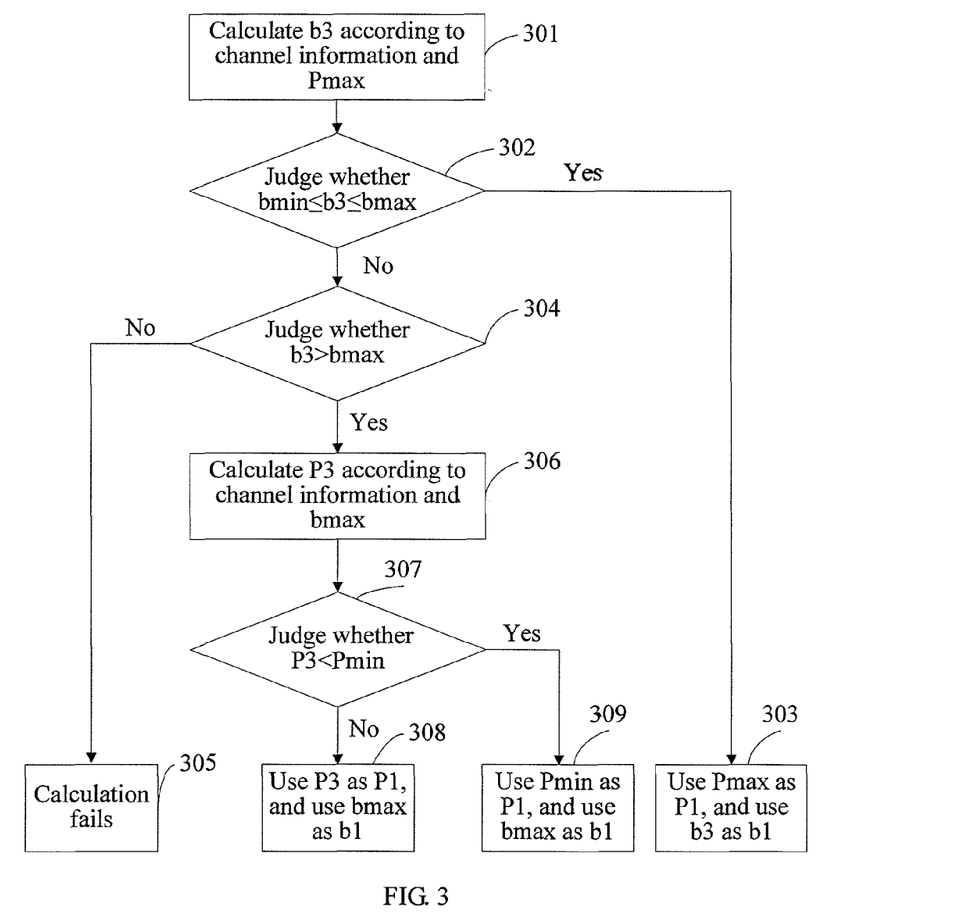
FIG. 3 is a flow chart of another method of calculating transmission power and a modulation mode according to an embodiment of the present invention.

As shown in FIG. 3, an embodiment of the present invention provides a method of calculating transmission power and a modulation mode. In this embodiment, for ease of description, it is set that the transmission power lower limit is Pmin, the transmission power upper limit is Pmax, the lower limit modulation mode is bmin, the upper limit modulation mode is bmax, the first transmission power is P1, the second transmission power is P2, the first modulation mode is b1, the second modulation mode b2, and the current transmission power is P0. The method includes the following steps:

S301: A third modulation mode is obtained through calculating according to the channel information and the transmission power upper limit.

Based on the following formula:

$$b3 = \log_2\left(1 + \frac{P_{max}|H|^2}{\Gamma\sigma^2}\right),$$

and b3 is obtained through calculating according to the channel transfer function H and channel noise power $\sigma^2$ of the channel information, and Pmax.

S302: Judge whether the third modulation mode is between the lower limit modulation mode and the upper limit modulation mode, and if yes, execute step S303; if not, execute step S304, that is, judge whether bmin≦b3≦bmax, if yes, execute step S303; if not, execute step S304.

S303: Use the transmission power upper limit as the first transmission power, and use the third modulation mode as the first modulation mode, that is, use Pmax as P1, and use b3 as b1.

S304: Judge whether the third modulation mode is greater than the upper limit modulation mode, and if yes, execute step S306; if not, execute step S305; that is, judge whether b3>bmax, if yes, execute step S306; if not, execute step S305.

S305: It indicates that communication may not be performed in the channel environment, and the calculation fails.

S306: Third transmission power is obtained through calculating according to the channel information, the current transmission power and the upper limit modulation mode.

P3 is obtained through calculating according to the formula $$P3 = \frac{(2^{b_{max}} - 1)\Gamma\sigma^2}{|H|^2},$$

the channel transfer function H and channel noise power $\sigma^2$ of the channel information, and bmax.

S307: Judge whether the third transmission power is greater than the transmission power lower limit, and if yes, execute step S308; if not, execute step S309; that is, judge whether P3>Pmin, if yes, execute step S308; if not, execute step S309.

S308: Use the third transmission power as the first transmission power, and use the upper limit modulation mode as the first modulation mode, that is, use P3 as P1, and use bmax as b1.

S309: Use the transmission power lower limit as the first transmission power, and use the upper limit modulation mode as the first modulation mode, that is, use Pmin as P1, and use bmax as b1.

In the embodiment of the present invention, the transmission power configuration information, the modulation mode configuration information, and the channel information are acquired, and calculation is performed according to the channel information parameter, the transmission power configuration information, and the modulation mode configuration information to obtain the first transmission power and the first modulation mode; then, the signal transmission is controlled according to the first transmission power and the first modulation mode. When the channel condition varies, the optimized transmission power and modulation mode are obtained according to the current channel information parameter, the transmission power configuration information and the modulation mode configuration information, thereby improving the transmission efficiency, and effectively avoiding service interruption caused by too low transmission power and a waste of a system gain caused by too high transmission power.

Figure 4:
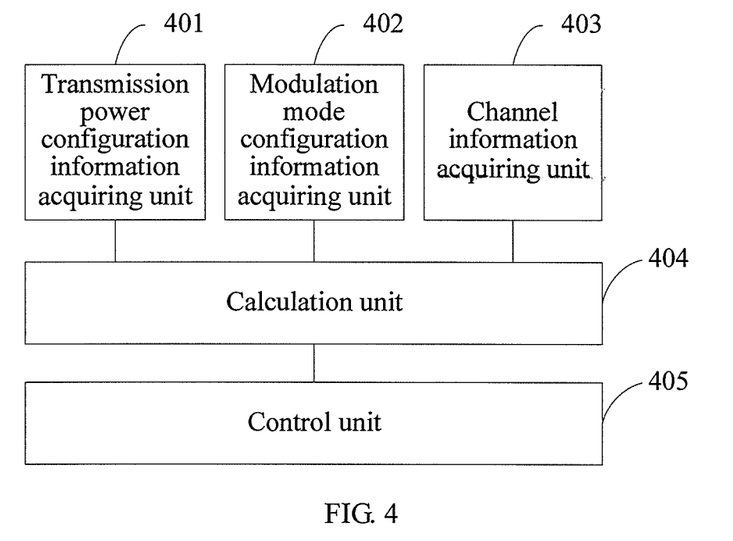
FIG. 4 is a structural diagram of an apparatus of adjusting transmission power according to an embodiment of the present invention.

As shown in FIG. 4, an embodiment of the present invention provides an apparatus of adjusting transmission power, which includes:

a transmission power configuration information acquiring unit 401, configured to acquire transmission power configuration information, where the transmission power configuration information includes a transmission power lower limit and a transmission power upper limit;

a modulation mode configuration information acquiring unit 402, configured to acquire modulation mode configuration information, where the modulation mode configuration information includes a lower limit modulation mode and an upper limit modulation mode;

a channel information acquiring unit 403, configured to acquire current channel information;

a calculation unit 404, configured to calculate according to the current channel information, the transmission power configuration information and the modulation mode configuration information to obtain first transmission power and a first modulation mode; and a control unit 405, configured to control signal transmission according to the first transmission power and the first modulation mode.

Figure 5:
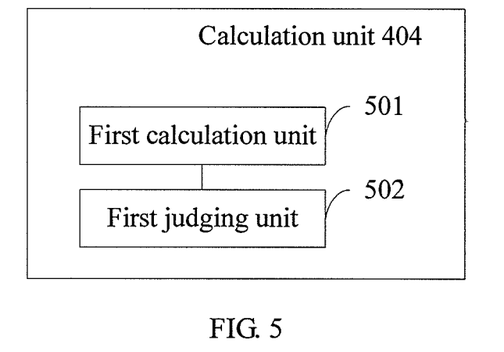
FIG. 5 is a structural diagram of a calculation unit according to an embodiment of the present invention.

The calculation unit 404 specifically includes:

a first calculation unit 501, configured to calculate according to the channel information and the upper limit modulation mode to obtain second transmission power; and a first judging unit 502, configured to use the second transmission power as the first transmission power and use the upper limit modulation mode as the first modulation mode, if the second transmission power is between the transmission power lower limit and the transmission power upper limit; calculate according to the transmission power upper limit and the channel information to obtain a second modulation mode if the second transmission power is greater than the transmission power upper limit, where if the second modulation mode is less than the lower limit modulation mode, it indicates that communication may not be performed in the channel environment and the calculation fails; use the transmission power upper limit as the first transmission power and use the second modulation mode as the first modulation mode, if the second modulation mode is greater than or equal to the lower limit modulation mode; and use the transmission power lower limit as the first transmission power and use the upper limit modulation mode as the first modulation mode, if the second transmission power is less than the transmission power lower limit.

Figure 6:
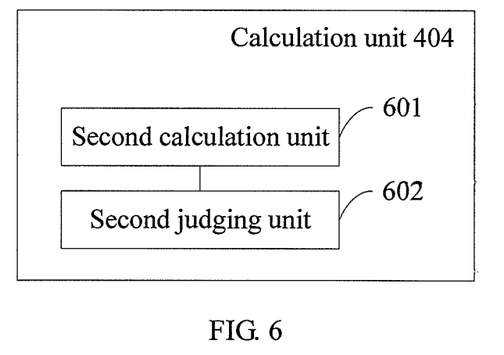
FIG. 6 is a structural diagram of another calculation unit according to an embodiment of the present invention.

The calculation unit 404 specifically includes:

a second calculation unit 601, configured to calculate according to the channel information and the transmission power upper limit to obtain a third modulation mode; and a second judging unit 602, configured to use the transmission power upper limit as the first transmission power and use the third modulation mode as the first modulation mode, if the third modulation mode is between the lower limit modulation mode and the upper limit modulation mode; if the third modulation mode is less than the lower limit modulation mode, it indicates that communication may not be performed in the channel environment and the calculation fails; calculate according to the channel information and the upper limit modulation mode to obtain third transmission power if the third modulation mode is greater than the upper limit modulation mode; use the third transmission power as the first transmission power and use the upper limit modulation mode as the first modulation mode, if the third transmission power is greater than the transmission power lower limit; and use the transmission power lower limit as the first transmission power and use the upper limit modulation mode as the first modulation mode, if the third transmission power is less than or equal to the transmission power lower limit.

In the embodiments of the present invention, the transmission power configuration information is acquired, where the transmission power configuration information includes the transmission power lower limit and the transmission power upper limit; the modulation mode configuration information is acquired, where the modulation mode configuration information includes a lower limit modulation mode, and an upper limit modulation mode; the current channel information is acquired; calculation is performed according to the current channel information, the transmission power configuration information and the modulation mode configuration information to obtain the first transmission power and the first modulation mode; and the signal transmission is controlled according to the first transmission power and the first modulation mode. When the channel condition varies, the optimized transmission power and modulation mode are obtained by taking account of the channel information, the current transmission power, the transmission power lower limit, the transmission power upper limit, the lower limit modulation mode and the upper limit modulation mode, thereby improving the transmission efficiency and effectively avoiding service interruption caused by too low transmission power and a waste of a system gain caused by too high transmission power.

The device embodiments are merely exemplary. Units described as separate components may be or may not be physically separated. Components shown as units may be or may not be physical units, that is, the components may be located in one place or distributed to a plurality of network units. Some or all of the modules may be selected to achieve the objective of the solutions of the embodiment according to actual demands. Persons skilled in the art may understand and implement the present invention without creative efforts.

Through the above description of the implementation, it is clear to persons skilled in the art that the implementation may be accomplished through software plus a necessary universal hardware platform or through hardware. Based on this understanding, the above technical solutions or the part that makes contributions to the prior art may be substantially embodied in the form of a software product. The computer software product may be stored in a computer readable storage medium such as a ROM/RAM, a magnetic disk, or an optical disk, and include several instructions to instruct computer equipment (for example, a personal computer, a server, or network equipment) to perform the method described in the embodiments of the present invention.

Finally, it should be noted that, the above embodiments are merely provided for describing the technical solutions of the present invention, but not intended to limit the present invention. It should be understood by persons skilled in the art that although the present invention has been described in detail with reference to the embodiments, modifications may be made to the technical solutions described in the embodiments, or equivalent replacements may be made to some technical features in the technical solutions, as long as such modifications or replacements do not depart from the idea and scope of the present invention.

What is claimed is:

1. A method of adjusting transmission power of a communication system by an apparatus, the method comprising:
    obtaining transmission power configuration information, wherein the transmission power configuration information comprises a transmission power lower limit and a transmission power upper limit;
    obtaining modulation mode configuration information, wherein the modulation mode configuration information comprises a lower limit modulation mode and an upper limit modulation mode;
    obtaining current channel information;
    calculating, according to the current channel information, the transmission power configuration information and the modulation mode configuration information, to obtain first transmission power and a first modulation mode;
    controlling signal transmission according to the first transmission power and the first modulation mode;
    wherein the calculating according to the current channel information, the transmission power configuration information and the modulation mode configuration information to obtain the first transmission power and the first modulation mode comprises:
        calculating, according to the channel information and the upper limit modulation mode, to obtain second transmission power;
        using the second transmission power as the first transmission power and using the upper limit modulation mode as the first modulation mode if the second transmission power is between the transmission power lower limit and the transmission power upper limit;
        calculating, according to the transmission power upper limit and the channel information, to obtain a second modulation mode if the second transmission power is greater than the transmission power upper limit, wherein if the second modulation mode is less than the lower limit modulation mode, it indicates that communication may not be performed in a channel condition and the calculating fails; using the transmission power upper limit as the first transmission power and using the second modulation mode as the first modulation mode, if the second modulation mode is greater than or equal to the lower limit modulation mode; and
        using the transmission power lower limit as the first transmission power and using the upper limit modulation mode as the first modulation mode, if the second transmission power is less than the transmission power lower limit.

2. A method of adjusting transmission power of a communication system by an apparatus, the method comprising:
    obtaining transmission power configuration information, wherein the transmission power configuration information comprises a transmission power lower limit and a transmission power upper limit;
    obtaining modulation mode configuration information, wherein the modulation mode configuration information comprises a lower limit modulation mode and an upper limit modulation mode;
    obtaining current channel information;
    calculating, according to the current channel information, the transmission power configuration information and the modulation mode configuration information, to obtain first transmission power and a first modulation mode;
    controlling signal transmission according to the first transmission power and the first modulation mode;
    wherein the calculating, according to the current channel information, the transmission power configuration information and the modulation mode configuration information, to obtain the first transmission power and the first modulation mode comprises:
        calculating, according to the channel information and the transmission power upper limit, to obtain a third modulation mode;
        using the transmission power upper limit as the first transmission power and using the third modulation mode as the first modulation mode, if the third modulation mode is between the lower limit modulation mode and the upper limit modulation mode;
        indicating that communication may not be performed in a channel condition and the calculating fails, if the third modulation mode is less than the lower limit modulation mode; and
        calculating, according to the channel information and the upper limit modulation mode, to obtain third transmission power if the third modulation mode is greater than the upper limit modulation mode; using the third transmission power as the first transmission power and using the upper limit modulation mode as the first modulation mode, if the third transmission power is greater than the transmission power lower limit; and using the transmission power lower limit as the first transmission power and using the upper limit modulation mode as the first modulation mode, if the third transmission power is less than or equal to the transmission power lower limit.

3. An apparatus of adjusting transmission power of a communication system, the apparatus comprising:

a transmission power configuration information acquiring unit, configured to acquire transmission power configuration information, wherein the transmission power configuration information comprises a transmission power lower limit and a transmission power upper limit;

a modulation mode configuration information acquiring unit, configured to acquire modulation mode configuration information, wherein the modulation mode configuration information comprises a lower limit modulation mode and an upper limit modulation mode;

a channel information acquiring unit, configured to acquire current channel information;

a calculation unit, configured to calculate, according to the current channel information, the transmission power configuration information and the modulation mode configuration information, to obtain first transmission power and a first modulation mode;

a control unit, configured to control signal transmission according to the first transmission power and the first modulation mode;

wherein the calculation unit comprises:

a first calculation unit, configured to calculate, according to the channel information and the upper limit modulation mode, to obtain second transmission power; and a first judging unit, configured to use the second transmission power as the first transmission power and use the upper limit modulation mode as the first modulation mode, if the second transmission power is between the transmission power lower limit and the transmission power upper limit; calculate, according to the transmission power upper limit and the channel information, to obtain the second modulation mode if the second transmission power is greater than the transmission power upper limit, wherein if the second modulation mode is less than the lower limit modulation mode, it indicates that communication may not be performed in a channel condition and the calculating fails; use the transmission power upper limit as the first transmission power and use the second modulation mode as the first modulation mode, if the second modulation mode is greater than or equal to the lower limit modulation mode; and use the transmission power lower limit as the first transmission power and use the upper limit modulation mode as the first modulation mode, if the second transmission power is less than the transmission power lower limit.

4. An apparatus of adjusting transmission power of a communication system, the apparatus comprising:

a transmission power configuration information acquiring unit, configured to acquire transmission power configuration information, wherein the transmission power configuration information comprises a transmission power lower limit and a transmission power upper limit;

a modulation mode configuration information acquiring unit, configured to acquire modulation mode configuration information, wherein the modulation mode configuration information comprises a lower limit modulation mode and an upper limit modulation mode;

a channel information acquiring unit, configured to acquire current channel information;

a calculation unit, configured to calculate, according to the current channel information, the transmission power configuration information and the modulation mode configuration information, to obtain first transmission power and a first modulation mode;

a control unit, configured to control signal transmission according to the first transmission power and the first modulation mode;

wherein the calculation unit comprises:

a second calculation unit, configured to calculate, according to the channel information and the transmission power upper limit, to obtain a third modulation mode; and a second judging unit, configured to use the transmission power upper limit as the first transmission power and use the third modulation mode as the first modulation mode, if the third modulation mode is between the lower limit modulation mode and the upper limit modulation mode; if the third modulation mode is less than the lower limit modulation mode, it indicates that communication may not be performed in a channel condition and the calculating fails; calculate, according to the channel information and the upper limit modulation mode, to obtain third transmission power if the third modulation mode is greater than the upper limit modulation mode; use the third transmission power as the first transmission power and use the upper limit modulation mode as the first modulation mode, if the third transmission power is greater than the transmission power lower limit; and use the transmission power lower limit as the first transmission power and use the upper limit modulation mode as the first modulation mode, if the third transmission power is less than or equal to the transmission power lower limit.

* * * * *